US009566696B2

(12) United States Patent
Yew et al.

(10) Patent No.: US 9,566,696 B2
(45) Date of Patent: Feb. 14, 2017

(54) HANDHELD MACHINE TOOL

(71) Applicant: ROBERT BOSCH GMBH, Stuttgart (DE)

(72) Inventors: Chuan Cheong Yew, Penang (MY); HuoyHuoy Lim, Petani Kedah (MY); Sim Teik Yeoh, Gelugor Penang (MY); Falk Herrmann, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 14/353,244

(22) PCT Filed: Sep. 26, 2012

(86) PCT No.: PCT/EP2012/068935
§ 371 (c)(1),
(2) Date: Apr. 21, 2014

(87) PCT Pub. No.: WO2013/060545
PCT Pub. Date: May 2, 2013

(65) Prior Publication Data
US 2014/0367928 A1     Dec. 18, 2014

(30) Foreign Application Priority Data

Oct. 24, 2011   (DE) .................. 20 2011 107 082 U (51) Int. Cl.
*B23B 31/107*   (2006.01)
*B25B 23/00*   (2006.01)
(Continued)

(52) U.S. Cl.
CPC ....... *B25B 23/0035* (2013.01); *B23B 31/1071* (2013.01); *B25B 21/00* (2013.01);
(Continued)

(58) Field of Classification Search
CPC ........ B25F 5/006; B25B 21/02; B25B 21/026; B25B 23/0035; B25B 21/00; Y10T 279/17; B23B 31/1071
See application file for complete search history.

(56) References Cited

U.S. PATENT DOCUMENTS

| | | | |
|---|---|---|---|
| 7,565,854 B2 * | 7/2009 | Chiang | ................. B25B 15/001 279/75 |
| 2004/0026877 A1 * | 2/2004 | Taylor | ................. B25B 23/0035 279/75 |

(Continued)

FOREIGN PATENT DOCUMENTS

| | | | |
|---|---|---|---|
| DE | 10 2010 002 353 | 8/2011 | |
| DE | 102010030642 A1 * | 12/2011 | ......... B25B 23/0035 |

(Continued)

OTHER PUBLICATIONS

International Search Report, PCT International Application No. PCT/EP2012/068935, dated Nov. 28, 2012.

*Primary Examiner* — Eric A Gates
*Assistant Examiner* — Paul M Janeski
(74) *Attorney, Agent, or Firm* — Norton Rose Fulbright US LLP; Gerard Messina (57) ABSTRACT

A handheld machine tool having an output shaft on which a tool holding fixture is developed, which has a multi-faced inner receptacle and a multi-faced outer receptacle, the multi-faced inner receptacle to connect to a tool insert, which can be locked using a locking device assigned to the tool holding fixture; the locking device having a locking sleeve which is displaceable for unlocking the tool insert against a spring force applied by an associated spring element in an axial direction facing away from the handheld machine tool, from a locking to an unlocking position, the locking sleeve has an operating element and a holding element connected to each other via a threaded connection, (Continued)

the holding element driven by the associated spring element in the direction of the locking position of the locking sleeve and the operating element enables displacement of the locking sleeve from the locking to the unlocking position.

10 Claims, 6 Drawing Sheets

(51) Int. Cl.
  *B25B 21/02* (2006.01)
  *B25F 5/00* (2006.01)
  *B25B 21/00* (2006.01)
(52) U.S. Cl.
  CPC ............ *B25B 21/02* (2013.01); *B25B 21/026* (2013.01); *B25F 5/006* (2013.01); *Y10T 279/17* (2015.01)

(56) References Cited

U.S. PATENT DOCUMENTS

| | | | | |
|---|---|---|---|---|
| 2005/0045001 A1* | 3/2005 | Huang | ................... | B25B 15/001 |
| | | | | 81/177.85 |
| 2006/0100024 A1* | 5/2006 | Cheng | ..................... | B25B 21/00 |
| | | | | 464/179 |
| 2008/0190251 A1* | 8/2008 | Huang | ................ | B25B 23/0035 |
| | | | | 81/438 |
| 2012/0326399 A1* | 12/2012 | Lin | ..................... | B23B 31/1071 |
| | | | | 279/75 |

FOREIGN PATENT DOCUMENTS

| | | | | |
|---|---|---|---|---|
| DE | 102011085420 A1 * | 5/2013 | ............ | B25B 21/00 |
| EP | 2 039 449 | 3/2009 | | |

* cited by examiner

HANDHELD MACHINE TOOL

FIELD

The present invention relates to an handheld machine tool having an output shaft on which a tool holding fixture is developed, which has a multi-faced inner receptacle and a multi-faced outer receptacle, the multi-faced inner receptacle being developed for connecting to a tool insert, that is able to be locked in the multi-faced inner receptacle using a locking device assigned to the tool holding fixture; the locking device having a locking sleeve, which is displaceable in an axial direction facing away from the handheld machine tool, against a spring force applied by an associated spring element for unlocking the tool insert, from a locking position to an unlocking position.

BACKGROUND INFORMATION

European Patent No EP 2 039 449 A1, describes a handheld machine tool developed as a rotary blow screwdriver, which has a tool holding fixture provided with a multi-faced inner receptacle and a multi-faced outer receptacle, the multi-faced inner receptacle being able to be connected to a tool insert having an outer multi-faced coupling, such as a screwdriver bit, and the multi-faced outer receptacle being able to be connected to a tool insert having an inner multi-faced coupling, such as a socket wrench. To fix a screwdriver bit in the multi-faced inner receptacle, a locking device is provided in which a locking sleeve, using an associated compression spring, is prestressed in an axial direction facing away from the screwdriver bit and, for unlocking as well as for taking out the screwdriver bit, has to be pushed against the force of this spring axially in the direction of the screwdriver bit, from a locking position into an unlocking position.

This may have a disadvantage that handling the handheld machine tool is cumbersome and difficult, since the locking sleeve in the axial direction has only a comparatively short length and a comparatively low diameter, and is thus difficult to grasp and hold during a displacement from the locking position to the unlocking position. This leads to a forfeiture of convenience in the use of such handheld machine tools.

SUMMARY

An object of the present invention is to provide a new handheld machine tool, which has a tool holding fixture having a multi-faced inner receptacle and a locking device which is simple and convenient to operate, and, particularly during unlocking, makes possible a safe and reliable removal of associated tool inserts.

This object may be attained, for example, by an example handheld machine tool having an output shaft on which a tool holding fixture is developed which has a multi-faced inner receptacle and a multi-faced outer receptacle. The multi-faced inner receptacle is developed for connecting to a tool insert, which is able to be locked using a locking device associated with the tool holding fixture in the multi-faced inner receptacle. The locking device has a locking sleeve which is able to be displaced for unlocking the tool insert against a spring force applied by an associated spring element in an axial direction facing away from the handheld machine tool, from a locking position to an unlocking position. The locking sleeve has an operating element and a holding element, which are connected to each other via a threaded connection, the holding element being driven by the associated spring element in the direction of the locking position of the locking sleeve. The operating element is developed to enable a displacement of the locking sleeve from the locking position into the unlocking position.

Consequently, the present invention enables providing an handheld machine tool whose tool holding fixture has a locking device having a locking sleeve which, by a two-part design, has an increased length in the axial direction and an enlarged diameter, and is thus comparatively convenient and safe to handle.

The operating element, at least in sections, preferably has a spiral-shaped internal screw thread which, for the development of the screw connection, is screwed onto an outer thread of the holding element that is developed spiral-shaped at least in sections.

Consequently it is possible to provide a two-part locking sleeve whose individual components are able to be connected to each other via a stable and robust thread connection.

Alternatively, the operating element may have an internal screw thread developed of concentric waves, at least in sections, which, for the development of the screw connection, is pressed onto an outer thread of the holding element that is developed of concentric waves, at least in sections.

Consequently, providing a two-part locking sleeve is made possible, whose individual components are able to be connected to each other via a reliable thread connection, in a rapid and uncomplicated manner.

According to one specific embodiment, the operating element has a first mounting aid element and the holding element has a second mounting aid element. The first and the second mounting aid elements are preferably developed at least to facilitate the fastening of the operating element to the holding element.

Consequently, the present invention makes possible providing a two-part locking sleeve, whose individual components are able to be fastened to each other by the provision of suitable mounting aid elements.

The first and the second mounting aid elements are developed according to the type of eight-faced outer circumferences.

Consequently, providing uncomplicated and cost-effective mounting aid elements is made possible.

According to one specific embodiment, a damping element is assigned to the threaded connection, for damping vibrations that occur in the operation of the handheld machine tool, in the area of the threaded connection.

The present invention thus enables providing a two-part locking sleeve, in which a release or separation, effected by vibrations occurring in the operation of the handheld machine tool, of its individual components from one another is able to be securely and reliably prevented.

The damping element preferably has an anti-vibration lacquer.

Consequently, a cost-effective as well as a rapidly and simply applicable damping element may be used.

According to one specific embodiment, at least two locking elements are assigned to the locking device which, in the locking position of the locking sleeve are driven by the operating sleeve into an associated locking position.

The present invention therefore makes it possible to provide a robust and stable locking device.

The operating element preferably has an outer grip area. Thus, providing a convenient operable locking sleeve may be made possible.

The object mentioned at the outset may also be attained by an example tool holding fixture having a multi-faced inner receptacle and a multi-faced outer receptacle. The multi-faced inner receptacle is developed for connecting to a tool insert, which is able to be locked using a locking device associated with the tool holding fixture in the multi-faced inner receptacle. The locking device has a locking sleeve which is able to be displaced for unlocking the tool insert against a spring force applied by an associated spring element in an axial direction facing away from the handheld machine tool, from a locking position to an unlocking position. The locking sleeve has an operating element and a holding element, which are connected to each other via a threaded connection, the holding element being driven by the associated spring element in the direction of the locking position of the locking sleeve. The operating element is developed to enable a displacement of the locking sleeve from the locking position into the unlocking position.

BRIEF DESCRIPTION OF THE DRAWINGS

The present invention is explained in greater detail below on the basis of exemplary embodiments shown in the figures.

DETAILED DESCRIPTION OF EXAMPLE EMBODIMENTS

Figure 1:
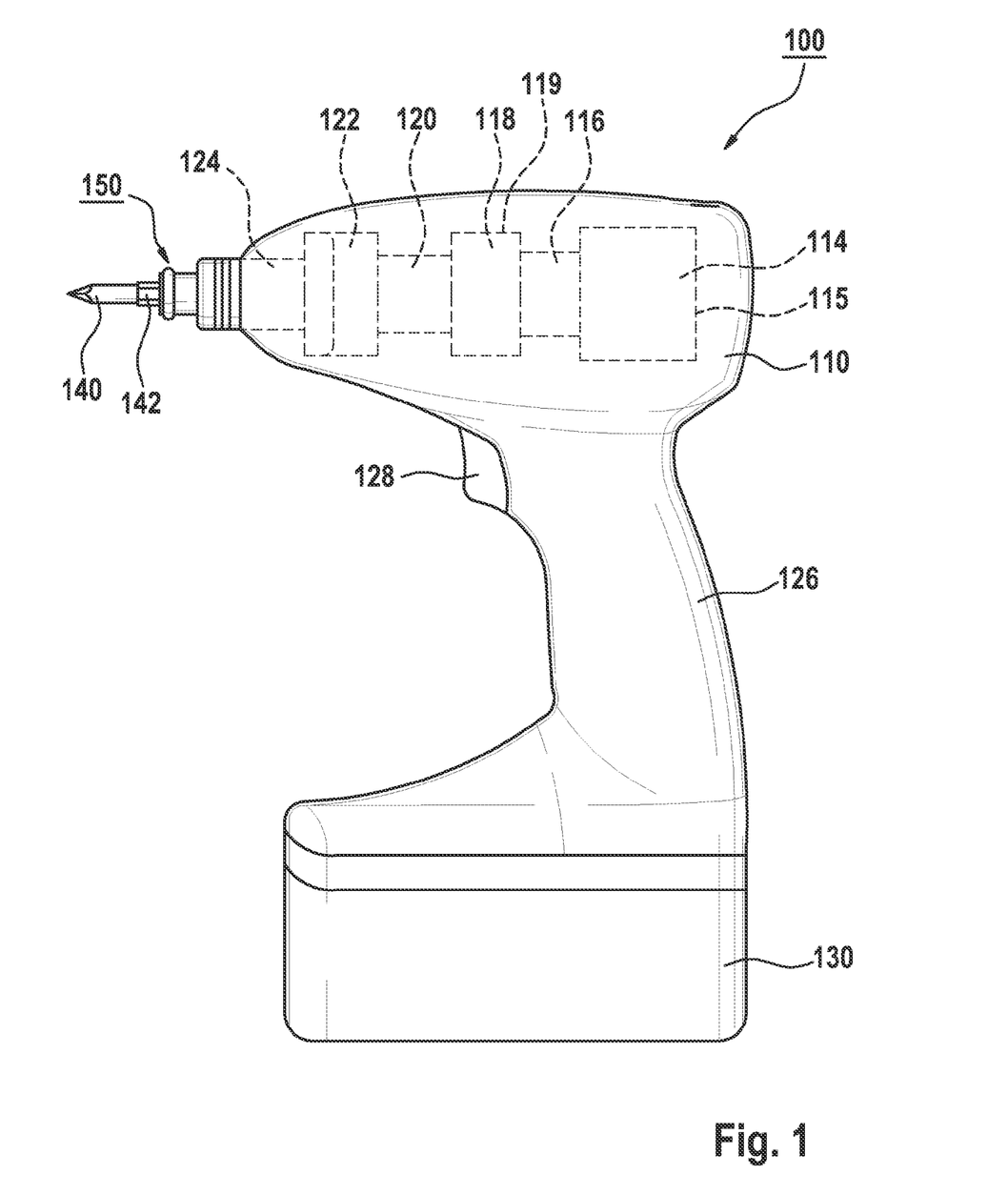
FIG. 1 shows a schematic view of an handheld machine tool having a tool insert according to one specific embodiment.

FIG. 1 shows an handheld machine tool 100 equipped with a tool holding fixture 150, which has a housing 110 having a handle 126. According to one specific embodiment, handheld machine tool 100 is able to be connected, mechanically and electrically, to a rechargeable battery pack 130 for a power supply that is network-independent.

Figure 2:
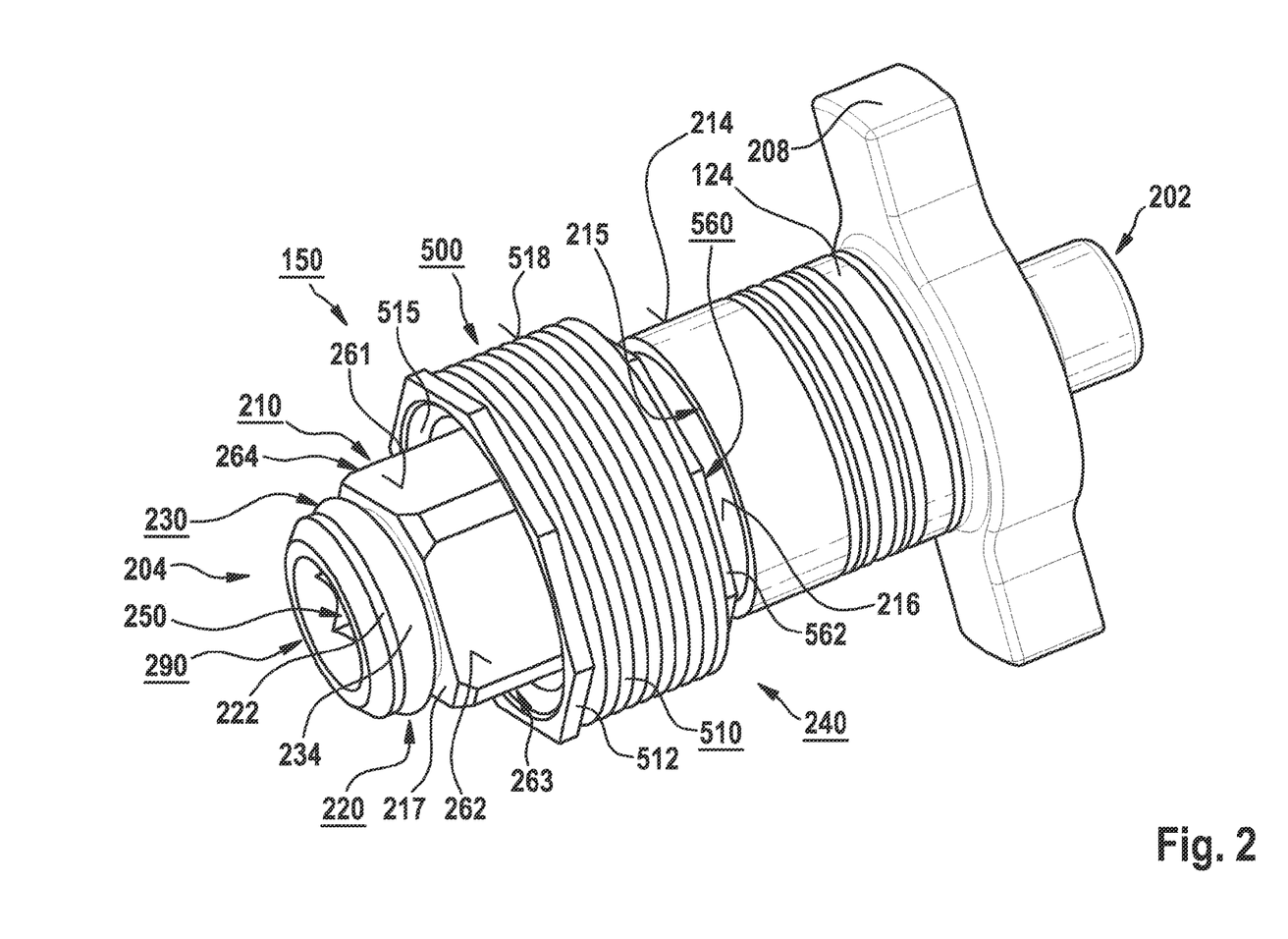
FIG. 2 shows a perspective view of the output shaft having the tool holding fixture of FIG. 1, and having the locking device according to one specific embodiment.
Figure 3:
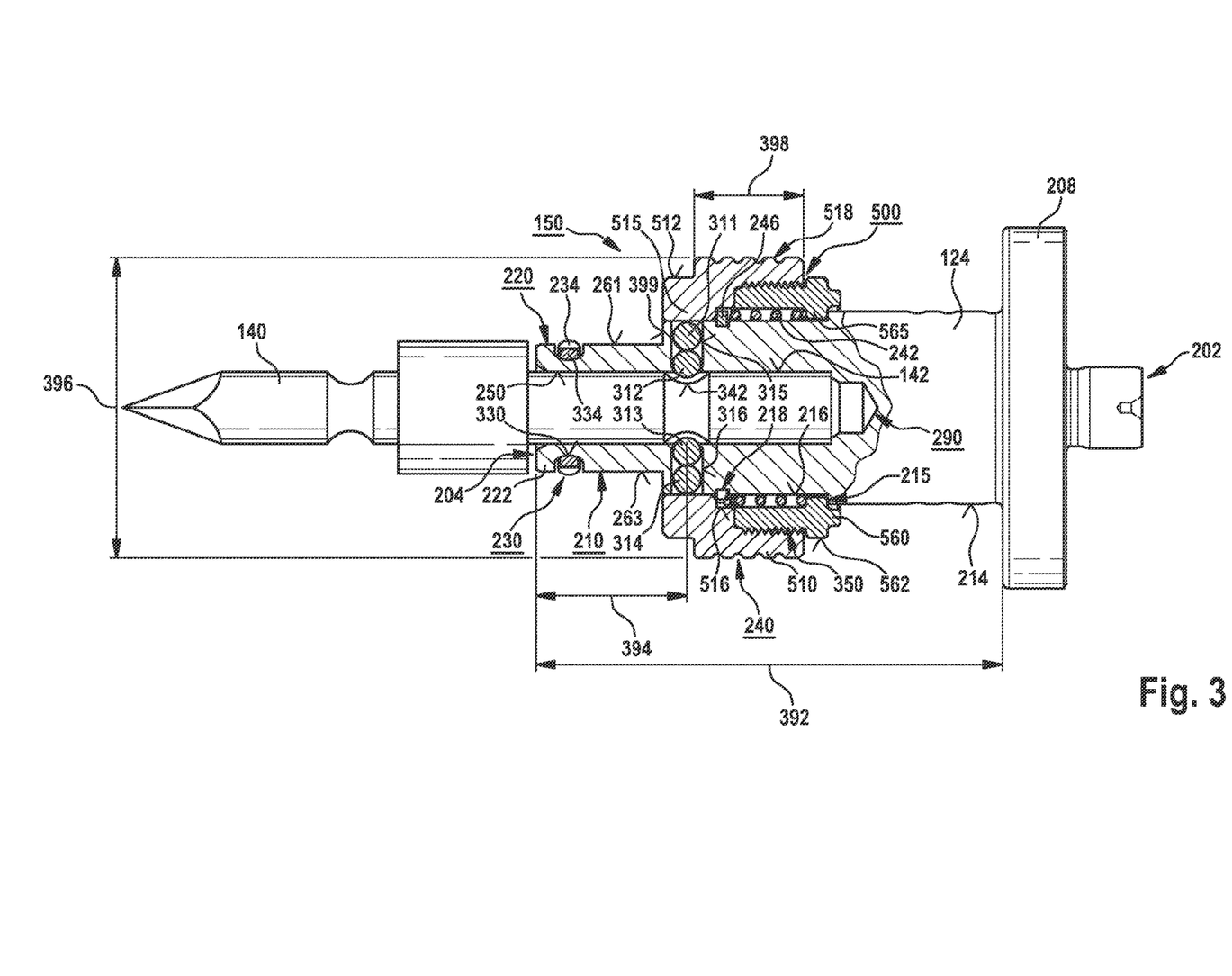
FIG. 3 shows a sectional view of the output shaft having the tool holding fixture and the tool insert of FIG. 1, as well as of the locking device of FIG. 2.
Figure 4:
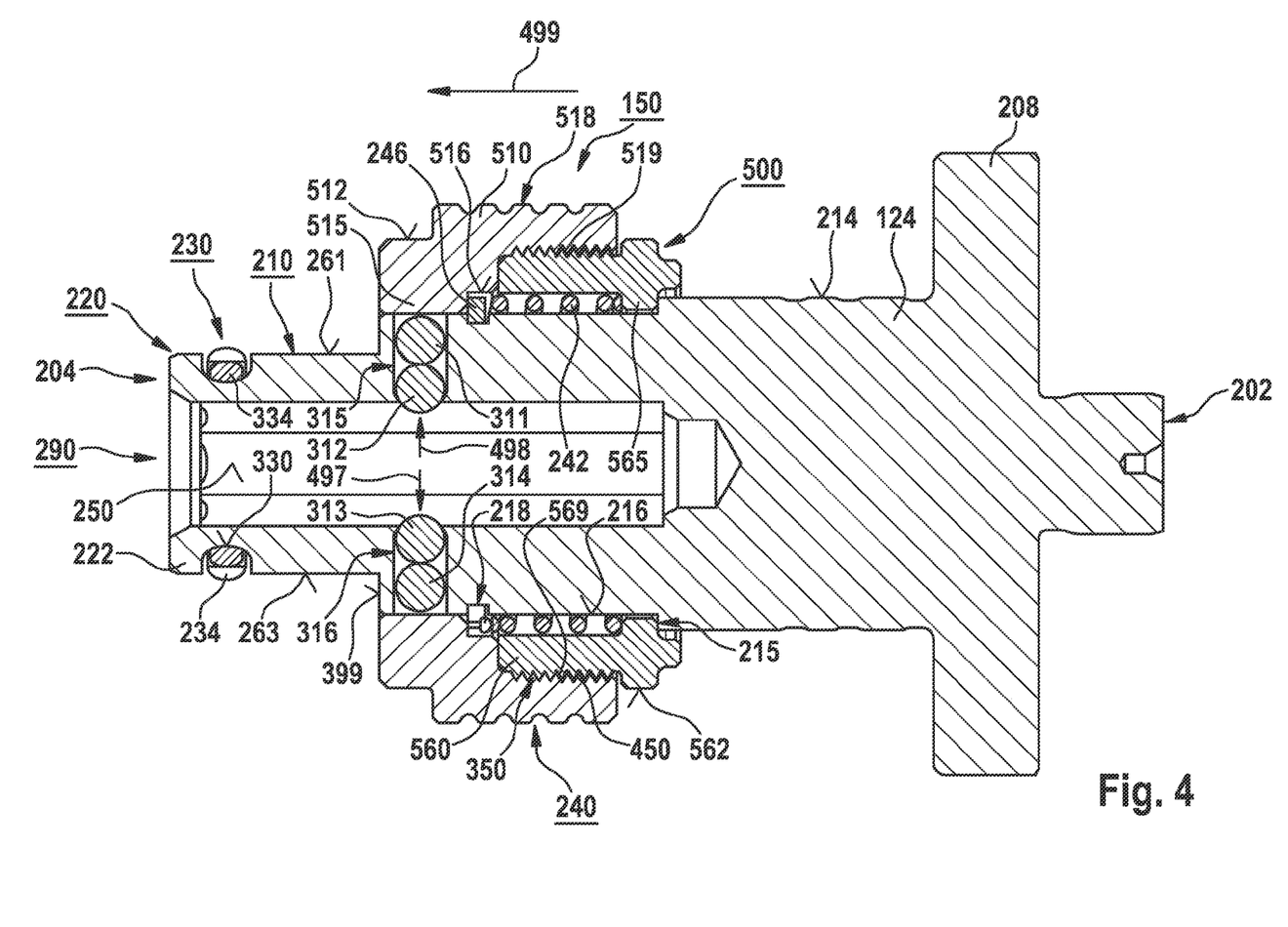
FIG. 4 shows the sectional view of FIG. 3 in an enlarged form, without the tool insert of FIG. 1.

Handheld machine tool 100 is designed as a battery-driven rotary blow screwdriver, by way of example. It should be pointed out, however, that the present invention is not limited to battery pack rotary blow screwdrivers, but rather may be used for different electric tool applications in which a tool is put into rotation, e.g., in a screwdriver, a drilling screwdriver, a rotary blow screwdriver etc., independently of whether the electric tool is to be operated network-independently using a battery pack or dependent on a network. In addition, one should point out that the present invention is not limited to motor-driven handheld machine tools, but is generally usable in tools in which tool holding fixture 150, described in FIGS. 2 through 4, is able to find application.

In tool housing 110, there are situated an electric drive motor 114 supplied with current by battery pack 130, a transmission 118 and a striking mechanism 122. Drive motor 114, for example, is able to be operated via a manual switch 128, that is, switched on and off, and may be of any desired motor type, for example, an electronically commutated motor or a DC motor. Preferably, drive motor 114 is controllable or regulatable electronically in such a way that both a reversing operation and specifications regarding a desired rotational speed are able to be implemented. The method of functioning and the design of a suitable drive motor are conventional so that a detailed description may be omitted here for the purpose of conciseness in the description.

Drive motor 114 is connected to transmission 118, via an associated motor shaft 116, which converts a rotation of motor shaft 116 to a rotation of a drive element 120 that is provided between transmission 118 and striking mechanism 122, for example, a drive shaft. This conversion preferably takes place in such a way that drive element 120 rotates with respect to motor shaft 116 at an increased torque, but decreased rotational speed. Drive motor 114 is situated illustratively in a motor housing 115, and transmission 118 in a transmission housing 119, transmission housing 119 and motor housing 115 being situated in housing 110, for example.

Optional striking mechanism 122 connected to drive element 120 is a turning or rotational striking mechanism, which generates abrupt rotating pulses at high intensity, and transmits them to an output shaft 124, such as an output spindle. On output shaft 124, tool holding fixture 150 is provided, which is preferably developed for accommodating tool inserts, and, according to one specific embodiment, is able to be connected both to a tool insert 140 having an outer multi-faced coupling 142 and to a tool insert having an inner multi-faced coupling, such as a socket wrench. Tool insert 140 is developed, for instance, as a screwdriver bit having an outer multi-faced coupling 142, illustratively a six-faced coupling which, in a suitable inner receptacle (290 in FIG. 2) is associated with tool holding fixture 150. Such a screwdriver bit is conventional so that, at this place, a detailed description may be omitted for the purpose of conciseness in the description.

FIG. 2 shows output shaft 124 of FIG. 1 provided with tool holding fixture 150, whose proximal end region 202, that is provided with an output cam 208, is connected in FIG. 1 to striking mechanism 122 of handheld machine tool 100. In distal end region 204 of output shaft 124, an axial widening 220 is developed, according to one specific embodiment. The latter is preferably connected in an attached form to tool holding fixture 150, that is provided with an outer receptacle 210 and an inner receptacle 290, and is preferably developed with it as one piece.

According to one specific embodiment, starting from output cam 208 in the direction of distal end region 204, output shaft 124 has a first, preferably cylinder-shaped section 214, having a first diameter D1. At a first annular shoulder 215, shaft 124 tapers down and goes over into a second cylindrical section 216, having a second diameter D2, where D2<D1. At a second annular shoulder (399 in FIG. 3), output shaft 124 tapers down some more and goes over into outer receptacle 210 which, in turn, goes over at a third annular shoulder 217 into axial widening 220.

Tool holding fixture 150, that is provided with outer receptacle 210 and inner receptacle 290 is illustratively formed onto output shaft 124 and preferably developed as one piece with it. To outer receptacle 210, preferably an elastically deformable retaining element 230 is assigned and to inner receptacle 290 an operable locking device 240 is assigned.

Outer receptacle 210 is a multi-faced outer receptacle, preferably a four-faced outer receptacle which, as seen in the radial direction, has illustratively four preferably flat side surfaces 261, 262, 263, 264, and, according to one specific embodiment, is developed to accommodate a tool insert manufactured according to European or North American industry standards, having an inner multi-faced coupling, such as a socket wrench. Side surfaces 261, 262, 263, 264 are illustratively connected to one another via beveled edges.

In the direction of distal end region 204 of output shaft 124, outer receptacle 210 goes over into axial widening 220. The latter has, for example, a closing collar 222, which has a conically beveled end in the direction of distal end region 204. The diameter of this closing collar 222 may be specified in such a way that it is smaller than the distance between two opposite side surfaces of outer receptacle 210, for instance, the distance between side surfaces 261 and 263 or 262 and 264.

Holding element 230 is fastened to outer receptacle 210 in the region of axial widening 220, for the fixing of a tool insert, produced according to a European or North American industry standard, having inner multi-faced coupling, such as a socket wrench. Holding element 230 illustratively has a fixing element 234, which is preferably developed as an elastically deformable, metallic C ring.

Inner receptacle 290 is developed, for instance, according to the type of a multi-faced inner receptacle on the inside of output shaft 124, and is used for accommodating screwdriver bit 140 of FIG. 1. Inner receptacle 290 illustratively has a six-edged inner profile 250. Operable locking device 240 for locking screwdriver bit 140 of FIG. 1 is assigned to inner receptacle 290, preferably via an operating element 500 executed as a locking sleeve.

According to one specific embodiment, locking sleeve 500 is able to be displaced from a locking position into an unlocking position for unlocking tool insert 140 against a spring force applied by an associated spring element (242 in FIG. 3) in the direction of distal end region 204 (499 in FIG. 4). Locking sleeve 500 is illustratively developed in two parts and has an operating element 510, that is provided with an inner annular shoulder 515 and an outer grip region 518, which is fastened to an associated holding element 560.

Operating element 510 has a first mounting aid element 512 assigned to it and holding element 560 has a second mounting aid element 562 assigned to it. First mounting aid element 512 is situated, for example, in the region of inner annular shoulder 515 at an axial end of operating element 510, which is illustratively facing tool insert 140. Second mounting aid element 562 is situated, for example, at an axial end of holding element 560 facing proximal end region 202 of output shaft 124.

First and second mounting aid element 512, 562 are developed at least to facilitate a fastening of operating element 510 to holding element 560. First and second mounting aid elements 512, 562 are illustratively developed according to the type of eight-edge outer perimeters, which are able to be gripped, for instance, with the aid of suitable eight-edged wrenches during the mounting of locking sleeve 500.

FIG. 3 shows the situation of FIG. 2 with output shaft 124, tool holding fixture 150 having locking device 240 and holding element 230, and tool insert 140 of FIG. 1. Holding element 230 illustratively has metallic C-ring 234 of FIG. 2 and a spring element 334, developed preferably as an O-ring of an elastic rubber material, which are situated in an associated annular groove 330 of axial widening 220. O-ring 334 is used in order, after the assembly, to act upon C-ring 234 radially, using a specified spring force.

Illustratively, outer multi-faced coupling 142 of tool insert 140 is locked in six-faced inner profile 250 of multi-faced inner receptacle 290 of tool holding fixture 150. For this purpose, tool insert 140 has, for instance, an outer annular groove 342, provided in the area of outer multi-faced coupling 142, for example, according to DIN 3126-E6.3, into which, according to one specific embodiment, at least two locking elements 312, 313 engage. These locking elements 312, 313 as well as two additional locking elements 311, 314, which are all illustratively developed like locking balls, are situated, for instance, in at least one first and one second radial opening 315 or 316 developed on the second cylinder-shaped section 216 of output shaft 124, for instance, in the area of a second shoulder 399, balls 311, 312 being inserted in opening 315 and balls 313, 314 in opening 316 of output shaft 124. In this connection, second radial opening 316 is diametrically opposite first radial opening, for example.

Locking balls 311, 312, 313, 314 are held by locking sleeve 500 in openings 315 and 316, balls 311, 312, 313, 314 being driven by inner annular shoulder 515 of operating element 510 of locking sleeve 500 into an associated locking position. This is associated with a locking position of locking sleeve 500 or locking device 240.

Locking device 240 has illustratively locking sleeve 244 developed from operating element 510 and holding element 560 and locking balls 311, 312, 313, 314. In addition, locking device 240 has a spring element 242 situated on the inside of locking sleeve 244 and developed as a compression spring, for example, and a retention element 246 situated in an annular groove 218 developed as a C-ring, for example, and provided on the outer circumference of output shaft 124.

According to one specific embodiment, operating element 510 and holding element 560 of locking sleeve 500 are each developed to be sleeve-shaped and are connected to each other via a threaded connection 350. For this, operating element 510, for instance, at least in sections, has a spiral-shaped internal screw thread (519 in FIG. 4) which, for the development of screw connection 350, is screwed onto an outer thread (569 in FIG. 4) of holding element 560 that is developed spiral-shaped at least in sections. However, it is pointed out that the use of a spiral-shaped inner and outer thread is of merely exemplary character and should not be understood as a restriction of the present invention. Rather, other threaded types or fastening forms may also be used. For example, inner thread (519 in FIG. 4) of operating element 510 and the outer thread (569 in FIG. 4) of holding element 560 may each be developed, at least in sections, of concentric waves, the outer thread (569 in FIG. 4) being pressed onto the inner thread (519 in FIG. 4). In addition, for example, screwing operating element 510 to holding element 560 may be implementable using screws that are radially screwed in, radially pressed in and/or adhered or welded pins, or via adhered and/or welded transverse or tangential pins.

According to one specific embodiment, holding element 560 provided with an annular inner shoulder 565 in the area of mounting aid element 562 is acted upon by spring element 242, situated illustratively between retaining element 246 and inner shoulder 565, in the direction of the locking position of locking sleeve 500, i.e., in the direction of proximal end region 202 of output shaft 124 against first annular shoulder 215. In order to enable a displacement of locking sleeve 500 from this position into the unlocking position, operating element 510 is provided. This may be grasped by a user at his grasping area 518 and shifted with holding element 560 against the spring force applied by spring element 242 in the direction of distal end region 204 of output shaft 124.

In the unlocking position, inner annular shoulder 515 of operating element 510 releases locking balls 311, 312, 313, 314. These are consequently able able to be shifted during a removal of tool insert 140 from multi-faced inner receptacle 290 into associated radial openings 315 or 316 of output shaft 124 radially outwards, in the direction of a broadened inner circumference 516, adjoining inner annular shoulder 515, of operating element 510, and are thus able to exit or roll out of annular groove 342 of tool insert 140, so that it is released.

According to one specific embodiment, operating element 510 has at its outer circumference a diameter 396 of at least 30 mm, and its grasping area 518, in the axial direction, has a length 398 of at least 10 mm, illustratively of 10.4 mm, for example. Consequently, diameter 396 and length 398 may be enlarged significantly with respect to customary operating sleeves, whose diameters and lengths in customary battery pack rotary blow screwdriver are mostly less than 23 mm and 9 mm, respectively. In addition, axial length 392 of output shaft 124, between its distal end region 204 and output cams 208 amounts to no more than 43 mm, for example, and the axial length 394 between distal end region 204 and a corresponding opening center of radial openings 315, 316 amounts to not more than 14 mm, for example. Consequently, lengths 392, 394 may also be shortened significantly which, in customary battery pack rotary blow screwdrivers are mostly around 44 mm, or rather, more than 25 mm.

FIG. 4 shows an arrangement of FIG. 3 without tool insert 140 to clarify an exemplary method of functioning of locking device 240 as well as an exemplary embodiment of threaded connection 350. This is developed illustratively by an inner thread 519 developed on the inner circumference of operating element 510, developed as described at FIG. 3, and an outer thread 569 developed on the outer circumference of holding element 560 as described at FIG. 3, and is provided, for instance, with a damping element 450, for damping vibrations occurring in the area of threaded connection 350 during operation of handheld machine tool 100 of FIG. 1. Damping element 450 may have an anti-vibration lacquer, for example.

Locking device 240 is shown illustratively in its locking position, in which spring element 242 presses holding element 560, and thus locking sleeve 500 against first annular shoulder 215, so that the inner annular shoulder of operating element 510 acts in a radially inward direction upon locking balls 311, 312, 313, 314 in openings 315 and 316. In a displacement of locking sleeve 500, as described with FIG. 3, into the unlocking position, as is indicated illustratively by arrow 499, locking balls 311, 312, 313, 314 are released and may thus be displaced radially outwards in the direction of widened inner circumference 516 of operating element 510, as is indicated by arrows 497, 498.

In an exemplary mounting of locking device 240 on tool holding fixture 150 or output shaft 124, first of all holding element 560, then spring element 242 and subsequently retaining C-ring 246 are pushed in the direction of output cams 208 onto output shaft 124, until retaining C-ring 246 engages in annular groove 218 and is thus axially fixed there. Then, after introducing balls 311, 312, 313, 314 into openings 315 and 316, operating element 510 is fastened to retaining element 560, for instance, by using mounting aid elements 512, 562.

Figure 5A:
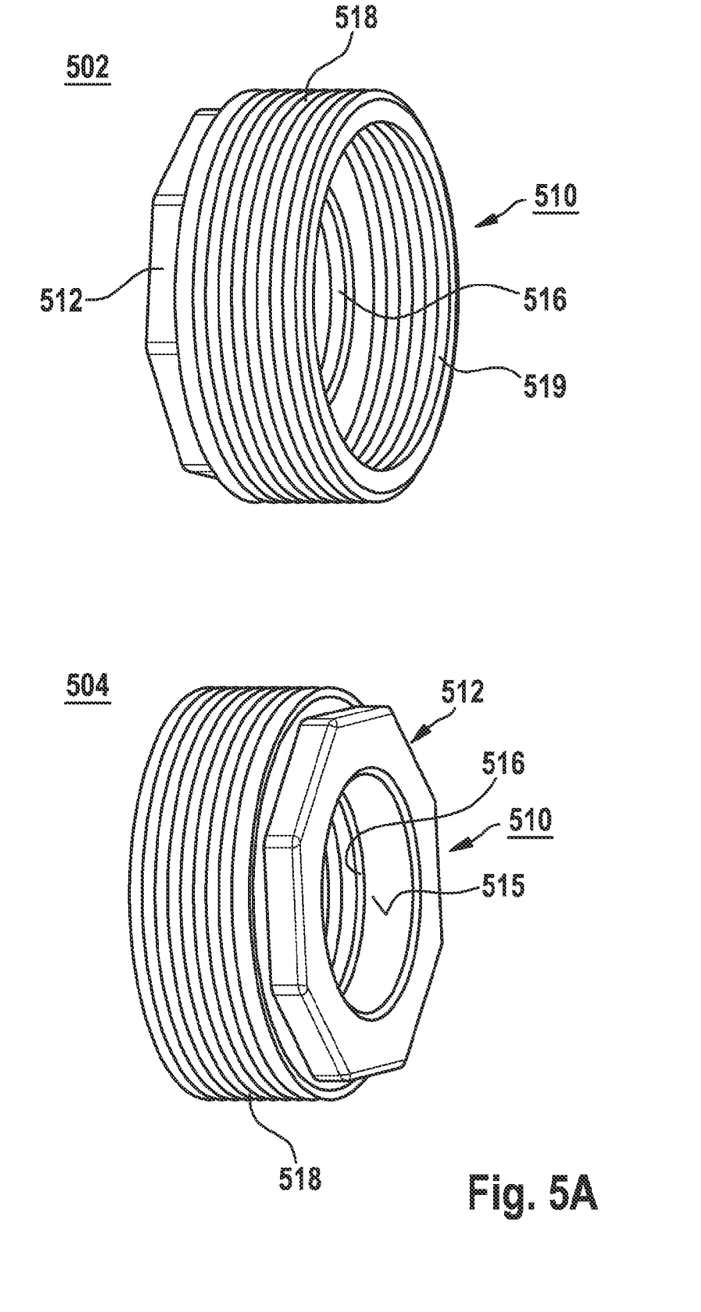
FIG. 5A shows a perspective view of the operating element of the locking sleeve of FIGS. 2 through 4.

FIG. 5A shows a first perspective view 502 of operating element 510 of FIGS. 2 through 4, to explain an inner thread 519 provided on it, which may be developed as described with FIG. 3. In addition, FIG. 5A shows a second perspective view 504 of operating element 510 to explain an exemplary embodiment of its gripping area 518 and its mounting aid element 512.

Figure 5B:
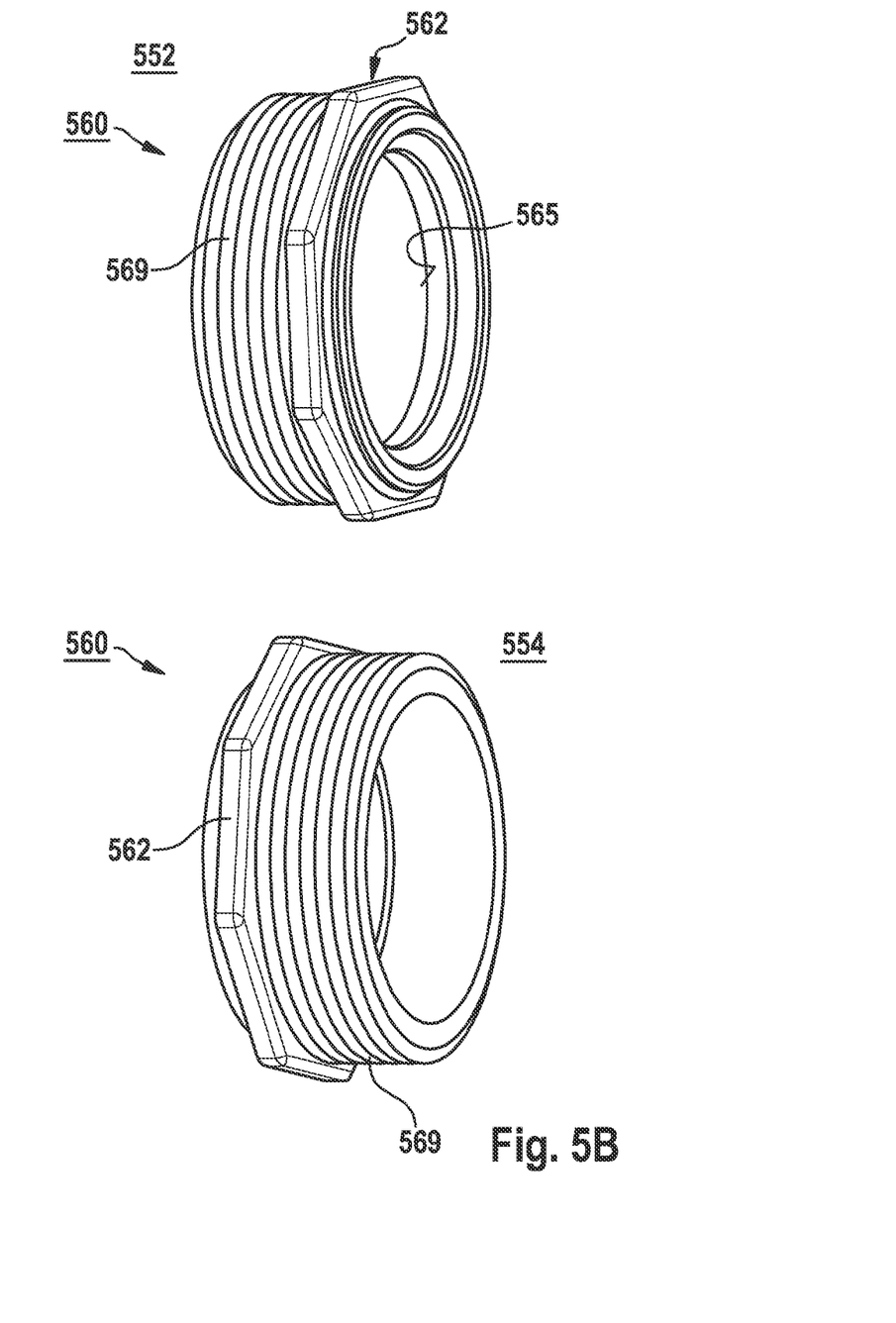
FIG. 5B shows a perspective view of the holding element of the locking sleeve of FIGS. 2 through 4.

FIG. 5B shows a first and second perspective view 552, 554 of holding element 560 of FIGS. 2 through 4, to explain an outer thread 569 provided on it, for example, which may be developed as described with FIG. 3, as well as its mounting aid element 562.

What is claimed is:

1. A handheld machine tool, comprising:
an output shaft; and
a tool holding fixture on the output shaft, the tool holding fixture having a multi-faced inner receptacle and a multi-faced outer receptacle, the multi-faced inner receptacle configured to connect to a tool insert that is configured to be locked in the multi-faced inner receptacle via a locking device assigned to the tool holding fixture, and the multi-faced outer receptacle configured to connect to a second tool insert that is configured to be locked on the multi-faced outer receptacle and in a same direction as the multi-faced inner receptacle connection to the tool insert,
wherein the locking device has a locking sleeve which is displaceable in an axial direction facing away from the handheld machine tool against a spring force applied by an associated spring element for unlocking the tool insert, from a locking position to an unlocking position,
wherein the locking sleeve has an operating element and a holding element which are connected to each other via a threaded connection, the holding element being acted upon by the associated spring element in the direction of the locking position of the locking sleeve, and the operating element is configured to enable the displacement of the locking sleeve from the locking position to the unlocking position.

2. The handheld machine tool as recited in claim 1, wherein the operating element, at least in sections, has a spiral-shaped internal screw thread which, for the development of the screw connection, is screwed onto an outer thread of the holding element that is developed spiral-shaped, at least in sections.

3. The handheld machine tool as recited in claim 1, wherein the operating element, at least in sections, has an internal screw thread developed from concentric waves which, for the development of the screw connection, is pressed onto an outer thread of the holding element that is developed of concentric waves, at least in sections.

4. The handheld machine tool as recited in claim 1, wherein the operating element has a first mounting aid element and the holding element has a second mounting aid element, the first and the second mounting aid element being developed at least to facilitate the fastening of the operating element to the holding element.

5. The handheld machine tool as recited in claim 4, wherein the first and the second mounting aid element are developed according to the type of eight-faced outer circumferences.

6. The handheld machine tool as recited in claim 1, wherein at least two locking elements are assigned to the locking device, which in the locking position of the locking sleeve are are driven by the operating element into an associated locking position.

7. The handheld machine tool as recited in claim 1, wherein the operating element has an outer grip region.

8. A handheld machine tool comprising:
an output shaft; and a tool holding fixture on the output shaft, the tool holding fixture having a multi-faced inner receptacle and a multi-faced outer receptacle, the multi-faced inner receptacle configured to connect to a tool insert that is configured to be locked in the multi-faced inner receptacle via a locking device assigned to the tool holding fixture, wherein the locking device has a locking sleeve which is displaceable in an axial direction facing away from the handheld machine tool against a spring force applied by an associated spring element for unlocking the tool insert, from a locking position to an unlocking position, wherein the locking sleeve has an operating element and a holding element which are connected to each other via a threaded connection, the holding element being acted upon by the associated spring element in the direction of the locking position of the locking sleeve, and the operating element is configured to enable the displacement of the locking sleeve from the locking position to the unlocking position, wherein a damping element is assigned to the threaded connection to damp vibrations that occur in the operation of the handheld machine tool, in the area of the threaded connection.

9. The handheld machine tool as recited in claim 8, wherein damping element has an anti-vibration lacquer.

10. A tool holding fixture, comprising:

a multi-faced inner receptacle and a multi-faced outer receptacle, the multi-faced inner receptacle configured for connection to a tool insert which is configured to be locked in the multi-faced inner receptacle via a locking device assigned to the tool holding fixture, and the multi-faced outer receptacle configured to connect to a second tool insert that is configured to be locked on the multi-faced outer receptacle and in a same direction as the multi-faced inner receptacle connection to the tool insert, wherein the locking device has a locking sleeve which is displaceable for unlocking the tool insert against a spring force applied by an associated spring element in an axial direction facing away from an associated handheld machine tool, from a locking position into an unlocking position, wherein the locking sleeve has an operating element and a holding element which are connected to each other via a threaded connection, the holding element being driven by the associated spring element in a direction of the locking position of the locking sleeve, and the operating element is configured to enable the displacement of the locking sleeve from the locking position to the unlocking position.

* * * * *